May 31, 1960  J. J. BANKER ET AL  2,938,646

CLOSURE PLUGS

Filed Jan. 7, 1958

INVENTORS
John J. Banker
Loren L. DeWolf

BY ⟨signature⟩

ATTORNEY

2,938,646
CLOSURE PLUGS

John J. Banker, Cranford, and Loren L. De Wolf, Chatham, N.J., assignors to The Babcock & Wilcox Company, New York, N.Y., a corporation of New Jersey Filed Jan. 7, 1958, Ser. No. 707,496

4 Claims. (Cl. 220—24.5)

This invention relates to an improved closure device for sealing an opening of a pressure vessel and more particularly to a plug type closure for sealing, for example, the end of a tube or tube stub and the like of a pressure operated fluid heating apparatus.

In the operation of a steam generating unit it is oftentimes desirable and at times necessary to plug or seal off one or more of the tubes or tube stubs at the header or drum to prevent the flow of fluid therefrom. Such conditions may arise either from a design consideration requiring a reduction in the amount of heating surface that is needed or from some mechanical defect such as a tube rupture. In either event it is essential that the sealing off of the tubes at the header be done quickly, simply, and effectively.

Heretofore, whenever it was required to seal off a tube or tube stub for any reason, it had been customary to seal the tube from within the header by driving a tapered plug in the end of the tube, access to the tube being had through an oppositely disposed hand-hole provided for the purpose. However, the use of such tapered plugs have not proven to be entirely satisfactory as they are both difficult to install or remove and damaging the tubes or the wall of the pressure vessel in which the tubes are expanded. Also experience has shown a considerable amount of difficulty has been encountered in the gasketed fittings for closing the hand holes provided for such access due to leakage or damage of the fittings and header facings.

An object of this invention is to provide an improved plug type closure for sealing an end of a tube or tube stub and the like at the header which is readily installed and removed from the outside of the header and which does not require any welding.

Another object of this invention is to provide a closure plug which positively resists the internal forces within a pressure vessel acting thereon and tending to expel the closure plug therefrom.

The foregoing objects and other allied features and advantages are attained in accordance with this invention by an improved closure plug which comprises essentially of a bolt having a head portion eccentrically connected to the stem thereof, the head being so proportioned that it is rendered readily insertable head-first into an opening, tube, or tube stub to be sealed from the outer end thereof. Arranged on the stem within the bore of the tube or the like to be sealed is a grooved end sealing ring disposed between a pair of follower or expander rings, the latter being adapted to engage in camming relationship the end grooves of the sealing ring and a nut threaded on that portion of the stem opposite the head and extending to the outside of the tube or opening. In accordance with this invention a fluid tight seal is formed by compressing the follower rings onto the sealing ring by the tightening of the nut from the outside whereby the sealing ring is expanded radially inwardly and outwardly into sealing contact with the stem and inner surface of the bore.

A feature of this invention resides in the provision that the instant plug renders it possible to seal an opening of a pressure vessel and the like from the exterior side thereof.

Another feature of this invention resides in the provision that the off-set or eccentric bolt head is adapted to engage an inside portion of the header or tube defining the bore to be sealed thereby positively absorbing a considerable portion of the load which would otherwise be transmitted to the threads and nut.

Another feature of the instant plug is that it is readily insertable from without the header, simple to install, readily removable without damage to the opening or tube and positive in operation.

Other features and advantages will be readily apparent when considered in view of the drawings and description in which:

Fig. 1 is an elevation view, partly in cross section, of the improved closure plug constructed in accordance with this invention as applied to a tube or tube stub connected in pressure tight relationship through a tube hole in the wall of a pressure vessel as is common in a steam generating unit or the like.

Figure 1:
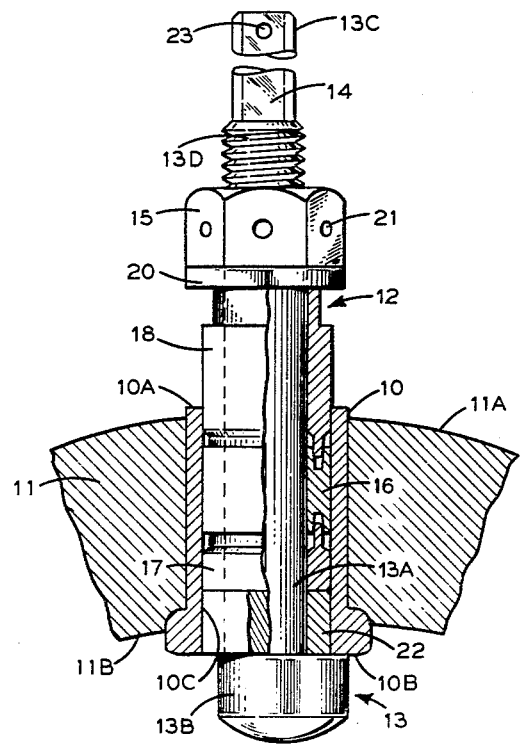

Referring to Fig. 1 a tube 10 is shown as it is customarily installed in a curved wall of a pressure vessel 11 operated at an internal fluid pressure above atmospheric, as for example a drum or header of a superheater, economizer or the like as is generally employed in a steam generating unit. Oftentimes in such units it is desirable or necessary to seal off the fluid flow from the vessel to the tube as for example when a tube develops a rupture anywhere along the length thereof. As it is oftentimes difficult, if not impossible to gain access to the inner end of the tube opening into the header, it becomes highly desirable to seal the tube from outside the header. This is particularly true in generating units operating on board ship where it is desirable to weld over the hand holes which heretofore generally provided the access means for sealing ruptured tubes from inside of the header.

As illustrated in Fig. 1, a tube 10 to be plugged in accordance with this invention is first cut at a position slightly beyond the outer surface 11A of the drum or header 11 and then sealed from the outside as will be herein described. The plug assembly 12 of the present invention is shown in position within the end of the tube stub 10. The assembly 12 includes a bolt 13 comprising a round stem 13A which has a head 13B eccentrically connected to one end thereof. The other end of the stem 13A is provided with a reduced portion 13C provided with flats 14 and a portion 13D intermediate the ends thereof and adjacent the flats 14 threaded for receiving a nut 15. The head 13B of the bolt is proportioned so that its diameter is less than that of the internal diameter of the tube bore so as to enable the bolt 13 to be readily insertable head-first into the tube 10 from the outer end 10A thereof.

As shown in Fig. 1, with the stem 13 in axial alignment with the center of the bore the eccentric or off-set head portion 13B is arranged to overlie a portion of the inner edge 10B of the tube. With the bolt 13 so positioned within the tube bore, a sealing ring 16 disposed between a pair of follower or expander rings 17 and 18 is positioned on the stem 13. Each ring 16, 17 and 18 has a central opening which is sufficiently large to permit the rings to be slidably mounted on the stem 13. The rings 16, 17 and 18 further function to center the stem within the tube bore.

Figure 2:
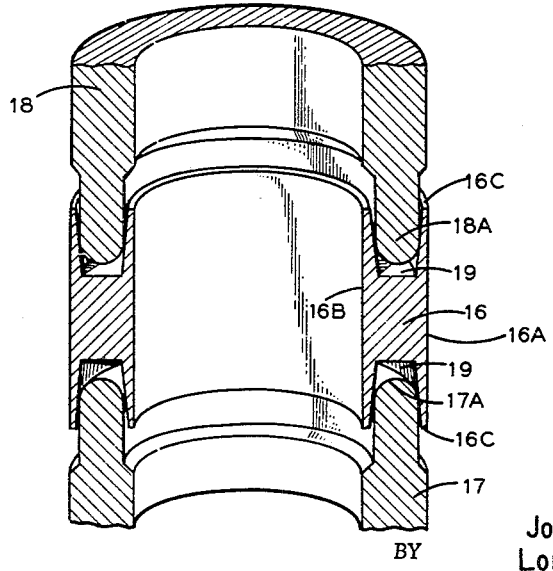
Fig. 2 is an enlarged, fragmentary detail view showing in section the assembly of the sealing ring with respect to the follower rings.

In accordance with this invention the sealing ring 16 has a smooth outer and inner sealing surface 16A, 16B which may be silver plated to provide for extra smoothness. Each end 16C of the sealing ring 16 is provided with a groove 19 which tapers inwardly as shown in Fig. 2. Each groove 19 is likewise adapted to receive a reduced, projecting, rounded, end portion 17A, 18A of the respective followers 17, 18 respectively disposed at either side of the sealing member 16. With the parts loosely assembled it will be noted that the projecting end portion 17A, 18A of follower 17, 18 projects into the grooves 19 an amount sufficient to seat the followers in the grooves. A washer 20 disposed in bearing relationship between follower 18 and a nut 15, threaded to the stem 13 completes the plug assembly 12.

With the parts so arranged, it will be noted that rotation of the nut so as to force the followers 17 and 18 inwardly toward one another causes the rounded, projecting, end portions 17A, 18A to effect a camming action on the inner tapering surfaces of the grooves, thus causing the inner and outer surfaces of the sealing ring 16 to be expanded radially inwardly and outwardly into sealing contact with the outer surface of the stem and interior surface of the bore. Consequently, a double seal is effected. As long as the sealing ring 16 is not expanded beyond the elastic limit of the material of which it is made in forming the seal, release of the compressive force by the appropriate rotation of the nut 15 will permit the ring 16 to assume its original unsealed position, thus rendering the same readily removable and re-usable.

In order to form a most effective seal, the interior surface of the tube may be reamed to insure a uniform diameter to properly fit the parts.

The flats 14 at the outer end of the stem 13 are provided so as to afford a means for gripping the bolt, as by wrench or the like, so as to prevent rotation of the bolt upon initial tightening of the nut. For positively locking the parts in the operative sealing position, the nut 15 is provided with a drilled hole 21 for receiving a suitable locking pin to secure the nut 15 and stem 13 in fixed position relative to each other.

Experience has shown that the portion 10C of the tube stub 10 adjacent the inner surface 11B of the drum 11 tends to become flaked, which flaking renders it desirable to move the sealing surface 16A of the ring 16 away from the flaked area 10C of the tube. Since reaming cannot sufficiently remove the effects of flaking, a spacer ring 22 is disposed between the head 13B of the bolt and follower 17 to displace the sealing ring away from the flaking area. Thus as noted in Fig. 1, the spacer 22 advances the position of the sealing ring 16 to a position above that at which flaking normally occurs. The use of a spacer ring 22 further provides flexibility in that the sealing rings and follower rings may be standardized for vessels which have varying wall thicknesses in that the length of the spacer ring 22 only need be varied to accommodate for the differences in the wall thicknesses of the headers.

If desired the end of the stem may be provided with a drilled hole 23 to which a cord may be tied so as to prevent a dropping of the part into the header during installation.

In general the improved closure plug illustrated is intended to be used in a high temperature and pressure fluid heating apparatus. Under such conditions the sealing ring 16 is formed of a material capable of withstanding such high temperatures and pressures.

An important advantage of the improved plug structure 12 is that when an internal pressure which can be very high, as for example 5000 p.s.i.g., is exerted onto the closure plug, the overlying portion of the head 13B acting in shear with the end of the tube and/or header portion defining the tube opening is capable of absorbing a considerable amount of the pressure load and at the same time positively insures against expulsion of the plug outwardly through the tube. Also, as a result the pressure load transmitted to the nut and threads is materially reduced.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. A readily removable closure plug means for sealing a bore of a high pressure vessel comprising a bolt, said bolt having a stem extending longitudinally of and spatially disposed within said bore and a head eccentrically connected to said stem for engaging an inner end portion of said bore on the pressure end thereof, said head having a diameter which is less than that of the bore so that said bolt is rendered freely insertable head first through the end of the bore opposite the pressure end thereof so that with the eccentric head in engagement with an inner peripheral portion of said bore to positively retain said bolt against expulsion due to the internal pressures exerted thereagainst the axis of said stem is rendered coincident with the longitudinal axis of said bore, a fluid impervious cylindrical annular metallic sealing member encircling said stem, said member having an inner and outer sealing surface adapted for engagement with said stem and bore respectively, each end of said sealing member having a tapered groove therein, an annular follower slidably mounted on said stem on either side of said sealing member, each of said followers having a projecting end portion adapted to be received in the tapered grooves on the ends of said sealing member; said sealing member and followers being disposed concentrically and in axial alignment with respect to the longitudinal axis of said bore and means for compressing said followers onto said sealing member therebetween to expand the sealing member radially inwardly and outwardly into sealing contact with the stem and bore respectively.

2. The invention as defined in claim 1, and including a spacer ring disposed between the head and one of said followers for spacing the latter from the inner end of said bore.

3. A pressure vessel having a bore forming an opening extending through a wall of the vessel and opening thereinto, a closure means comprising a stem having a head eccentrically connected thereto at one end, flats formed on the other end and a threaded portion intermediate the ends of said stem adjacent said flats, said bolt head having a diameter which is less than that of said bore so that said bolt is readily insertable head-first through said bore from without said pressure vessel so that with the stem center along the longitudinal axis of said bore the eccentric head is rendered adaptable for engagement with an interior peripheral portion of said bore to positively retain said bolt against expulsion due to the internal pressures exerted thereagainst, a fluid impervious metallic sealing member encircling said stem at a position intermediate the ends of said bore, said sealing member having inner and outer sealing surfaces and a tapered groove in each end thereof, a metallic follower disposed on either side of said sealing member, said followers each having a projecting end portion adapted to be received in the grooves of said sealing member, a spacer ring disposed between the head and one of said followers for spacing the latter from the inner end of said bore and a nut threaded on said stem for compressing said followers onto said sealing member to radially expand the sealing surfaces of the sealing member into sealing contact with the wall of said bore.

4. A readily removable closure plug means for sealing a bore of a high pressure vessel comprising a bolt, said bolt having a stem extending longitudinally of and spatially disposed within said bore, and a head eccentrically connected to said stem for engaging an inner end portion of said bore on the pressure side thereof, said head having a diameter which is less than that of the bore so that said bolt is rendered freely insertable head first through the end of the bore opposite the pressure side thereof, whereby the eccentric head is adapted to engage an inner peripheral portion of said bore to positively retain said bolt against expulsion due to internal pressures exerted thereagainst, a fluid impervious sealing member encircling said stem, said member having an inner and outer sealing surface adapted for engagement with said stem and bore respectively, each end of said sealing member having a tapered groove therein, and a follower slidably mounted on said stem on either side of said sealing member, each of said followers having a projecting end portion adapted to be received by the tapered grooves of said sealing member, said sealing member and followers being co-axially disposed in axial alignment with respect to the longitudinal axis of said stem, and means for compressing said followers onto said sealing member therebetween to expand said sealing member radially inward and outward into sealing contact with the stem and bore, respectively.

References Cited in the file of this patent

UNITED STATES PATENTS

| | | |
|---|---|---|
| 530,840 | Harrison | Dec. 11, 1894 |
| 1,043,298 | Clark | Nov. 5, 1912 |
| 2,793,784 | McInnes | May 28, 1957 |